(12) United States Patent
Kavun (10) Patent No.: US 11,879,458 B2
(45) Date of Patent: *Jan. 23, 2024

(54) ROTARY PISTON COMPRESSOR/PUMP/BLOWER WITH A VENTILATION CHANNEL

(71) Applicant: Gardner Denver Schopfheim GMBH, Schopfheim (DE)

(72) Inventor: Dimitrij Sergey Kavun, Schopfheim (DE)

(73) Assignee: Gardner Denver Schopfheim GMBH, Schopfheim (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/944,017

(22) Filed: Sep. 13, 2022

(65) Prior Publication Data

US 2023/0017937 A1      Jan. 19, 2023

Related U.S. Application Data

(63) Continuation of application No. 16/981,044, filed as application No. PCT/EP2019/056322 on Mar. 13, 2019, now Pat. No. 11,441,563.

(30) Foreign Application Priority Data

Mar. 15, 2018   (DE) .......................... 102018203992.5

(51) Int. Cl.
   *F04C 18/12*   (2006.01)
   *F04C 29/04*   (2006.01)

(52) U.S. Cl.
   CPC .......... *F04C 18/123* (2013.01); *F04C 29/042* (2013.01); *F04C 2250/10* (2013.01)

(58) Field of Classification Search
   CPC .......... F01C 1/12; F02B 53/04; F04C 18/123; F04C 2220/50; F04C 29/042
   See application file for complete search history.

(56) References Cited

U.S. PATENT DOCUMENTS 3,863,609 A   2/1975  Ikarashi
4,059,368 A   11/1977 McGahan et al.
(Continued)

FOREIGN PATENT DOCUMENTS

DE   202009010390 U1   10/2009
EP       2295806 A2    3/2011
(Continued)

OTHER PUBLICATIONS

Office Action in Europe for Application No. 19711322.8, dated Jan. 4, 2023.
(Continued)

*Primary Examiner* — Mary Davis
(74) *Attorney, Agent, or Firm* — Kevin E. West; Advent, LLP (57) ABSTRACT

A rotary piston compressor/pump/blower includes a housing spatially limiting a working chamber, an intake connection for guiding fluid into the working chamber, a pressure connection for guiding the fluid out of the working chamber, and a rotor assembly having a first rotor rotatably arranged in a first working sub-chamber and a second rotor cooperating with the first rotor and rotatably arranged in a second working sub-chamber. The rotary piston compressor/pump/blower also includes a ventilation channel, formed in the housing and connected to the working chamber via a ventilation channel opening, for the temporally limited introducing of air into the working chamber, wherein the ventilation channel opening is open at least in sections, in particular completely open, in a compression phase.

17 Claims, 6 Drawing Sheets

(56) References Cited

U.S. PATENT DOCUMENTS

| | | | |
|---|---|---|---|
| 6,439,865 | B1 | 8/2002 | Garczorz et al. |
| 11,441,563 | B2 * | 9/2022 | Kavun .................. F04C 29/042 |
| 2016/0040669 | A1 | 2/2016 | Yoshida et al. |
| 2016/0040699 | A1 | 2/2016 | Nayar |

FOREIGN PATENT DOCUMENTS

| | | |
|---|---|---|
| GB | 625490 A | 6/1949 |
| GB | 2111126 A | 6/1983 |
| JP | S59115489 A | 7/1984 |
| JP | 2016148281 A | 8/2016 |

OTHER PUBLICATIONS

Examination Report from European Application No. 19711322.8, dated Jul. 29, 2021.
International Search Report for PCT/EP2019/056322, dated May 31, 2019.
Office Action for German Application No. 102018203992.5, dated Mar. 30, 2020.
Examination Report in Canada for Application No. 3,094,009, dated Mar. 30, 2023.

\* cited by examiner

ROTARY PISTON COMPRESSOR/PUMP/BLOWER WITH A VENTILATION CHANNEL

CROSS-REFERENCE TO RELATED APPLICATIONS

The present application is a continuation under 35 U.S.C. § 120 of U.S. patent application Ser. No. 16/981,044, filed Sep. 15, 2020, and titled "ROTARY PISTON COMPRESSOR/PUMP/BLOWER WITH A VENTILATION CHANNEL," which itself claims the benefit of International Application No. PCT/EP2019/056322, filed Mar. 13, 2019, and titled, "ROTARY PISTON ENGINE," which itself claims the priority of German Application No. DE 10 2018 203 992.5, filed Mar. 15, 2018. U.S. patent application Ser. No. 16/981,044, International Application No. PCT/EP2019/056322, and German Application No. DE 10 2018 203 992.5 are herein incorporated by reference in their entireties.

BACKGROUND

A pump is a device that can move fluid by mechanical action. A rotary pump can use a rotor that rotates inside a cavity to move fluid.

DRAWINGS

The Detailed Description is described with reference to the accompanying figures. The use of the same reference numbers in different instances in the description and the figures may indicate similar or identical items.

DETAILED DESCRIPTION

Referring generally to FIGS. 1 through 6, a rotary piston compressor/pump/blower, in particular a claw machine, which can be operated, for example, as a compressor, a vacuum pump or a blower is described. The present disclosure also describes methods for operation of a rotary piston compressor/pump/blower. As described herein, the rotary piston compressors/pumps/blowers of the present disclosure are particularly effective, in particular in relation to intake capacity, and can be extremely long-lasting.

In the housing of the rotary piston compressors/pumps/blowers, a ventilation channel is formed, which temporarily produces—directly or indirectly—fluid communication between the working chamber or at least one of the working sub-chambers, in particular the first working sub-chamber, and the environment. The ventilation channel opens out into the working chamber via a ventilation channel opening, in particular on the pressure side.

In the compression phase, the ventilation channel is open, so that air, in particular ambient air with ambient pressure, gets into the working chamber from outside. In the case of an at least partial opening of the ventilation channel opening, supply of air into the working chamber from outside is possible.

In particular, the ventilation channel or the ventilation channel opening is open in a suction phase or in a suction cycle, which, depending on an operating point, leads to an expansion or ventilation of the space in the housing of the rotary piston compressor/pump/blower or of the gas located there, which space is in direct or indirect fluid communication with the ventilation channel or ventilation channel opening.

Thermal loads on parts of the rotary piston compressor/pump/blower, such as by bearing(s) and shaft(s), can thus be reduced effectively by the introduced air. The introduced air generally has a lower energy level. The effectiveness of the rotary piston compressor/pump/blower is therefore particularly high. In particular, the vacuum level of the rotary piston compressor/pump/blower remains undisturbed as a result of the temporary introduction of air into the working chamber during the compression phase. The introduced air reduces the inner compression.

When the ventilation channel opening is completely closed, supply of air into the working chamber from outside is prevented.

In some embodiments, during operation, the first and/or second rotor sweep past the ventilation channel opening. In some embodiments, the first and/or second rotor sweep past the pressure connection opening and/or the intake connection opening.

In some embodiments, the ventilation channel is substantially circular in cross-section. In embodiments, the ventilation channel opening is smaller, in particular substantially smaller, than the pressure connection opening and/or the intake connection opening. For example, it can have a surface area of between 10 $mm^2$ and 200 $mm^2$, e.g., between 20 $mm^2$ and 100 $mm^2$. In embodiments, the surface area of the ventilation channel opening is between 1% and 10%, e.g., between 2% and 10%, between 2% and 5%, of the surface area of the intake connection opening. In some embodiments, it is between 7% and 20%, e.g., between 10% and 16%, of the surface area of the pressure connection opening.

The housing can have a housing base part and a first and second end part connected to the housing base part. In embodiments, the end parts are connected to the housing base part, in particular releasably, opposite one another.

The working chamber can have a cross-section which is formed by two intersecting circles forming an "8"-shape.

Gas can be introduced into the working chamber or into the working sub-chambers via the intake connection. In some embodiments, the intake connection opens out into the working chamber or at least one of the working sub-chambers via at least one intake connection opening. In embodiments, the intake connection opening is located in an intake region of the rotary piston compressor/pump/blower.

Gas can be discharged from the working chamber or from a working sub-chamber via the pressure connection, in particular under positive pressure or negative pressure. In some embodiments, the pressure connection is connected to the working chamber or at least one of the working sub-chambers, in particular the first working sub-chamber, via at least one pressure connection opening. In embodiments, the pressure connection opening is located in a pressure region of the rotary piston compressor/pump/blower.

In embodiments, each working sub-chamber is outwardly spatially limited by a working-chamber wall of the housing, which runs in an arcuate manner at least in regions on the inside. The associated rotor sweeps along the working-chamber wall.

In some embodiments, the rotors can work contactlessly and are configured differently. In embodiments, they are matched to one another. During operation, they may rotate in opposite directions to one another and then mesh at least temporarily with one another. In embodiments, each rotor has at least two rotor blades, which are shaped like claws. In embodiments, each rotor blade has a claw and a claw recess. In some embodiments, the first and/or second rotor, e.g., depending on the respective rotary position, at least temporarily controls or influences, in particular closes or releases, the intake connection and/or pressure connection, in particular on the end face, with its rotor blades.

In some embodiments, the rotary piston compressor/pump/blower is particularly efficient. In embodiments, the operating pressure or the end pressure of the rotary piston compressor/pump/blower is achieved in one stage or in one step, in particular starting from an atmospheric pressure.

In some embodiments, the first rotor is arranged or formed in such a way that it controls or influences the ventilation channel opening in its effective opening cross-section, in particular on the end face, in particular with its rotor blades. In embodiments, depending on the respective rotary position of the first rotor, the ventilation channel opening is completely released, completely closed or partially released/closed. As described, the first rotor can form a control piston.

In some embodiments, in the common working-space phase of the rotors, the ventilation channel opening is completely closed, so that a supply of air from outside is avoided. In embodiments, in the common working-space phase, a first working sub-space spatially limited by the first rotor in the first working sub-chamber is in fluid communication with a second working sub-space spatially limited by the second rotor in the second working sub-chamber. The working sub-spaces adjoin one another. In embodiments, they are located on a common side of the rotary piston compressor/pump/blower. In some embodiments, the second rotor can form a delivery piston.

In some embodiments, in the common working-space phase the pressure connection is completely closed. This can take place by way of the first rotor and the second rotor. Therefore, an extremely effective compression of the gas in the working chamber is provided. In embodiments, an output of the gas from the working chamber in the common working-space phase is prevented.

In some embodiments, in the common working-space phase there is a free dead space at least temporarily between the rotors. In embodiments, the dead space is located in a central region of the working chamber.

In some embodiments, a rotary piston compressor/pump/blower provides a particularly simple and efficient achievement of the operating pressure.

In some embodiments, a rotary piston compressor/pump/blower effectively prevents the rotor assembly from pushing the gas out via the ventilation channel.

In some embodiments, a rotary piston compressor/pump/blower allows the gas to be pushed out of the working chamber via the pressure connection.

In some embodiments, a ventilation channel opening is arranged in a pressure region of the rotary piston compressor/pump/blower. In this manner, a pressure can be altered, such as increased or reduced, compared to the original, in particular atmospheric, pressure. The ventilation channel opening is thus arranged at a distance from an intake region of the rotary piston compressor/pump/blower.

In some embodiments, the ventilation channel opening is arranged alongside, but at a distance from, the pressure connection opening of the pressure connection. In particular, in embodiments, the ventilation channel opening is arranged upstream of the pressure connection opening in the rotational direction of the first rotor.

In some embodiments, an end part is configured as a bearing plate, in particular a B-bearing plate. In some embodiments, the end part carries at least one bearing for bearing the rotor assembly. In embodiments, the end part is removable.

As described, a rotary piston compressor/pump/blower includes a housing 1, which spatially limits a working chamber 2. An actuatable rotor assembly 3 is arranged in the working chamber 2. The rotary piston compressor/pump/blower also has an intake connection 4, which opens out into the working chamber 2 via an intake connection opening 5. Furthermore, the rotary piston compressor/pump/blower has a pressure connection 6 arranged at a distance from the intake connection 4, which pressure connection is in fluid communication with the working chamber 2 via a pressure connection opening 7. The rotary piston compressor/pump/blower additionally has a ventilation channel 8, which opens out into the working chamber 2 via a ventilation channel opening 9.

In embodiments, the housing 1 is in multiple parts. The housing 1 can include a first bearing plate 10 and a housing base part 11 and also a second bearing plate (not shown). The bearing plates 10 are arranged at opposite sides of the housing base part 11 in the assembled state of the housing 1.

The bearing plates 10 and the housing base part 11 together limit the working chamber 2. The bearing plates 10 spatially limit the working chamber 2 in the longitudinal direction or axially, while the housing base part 11 or its working-chamber wall spatially limits the working chamber 2 laterally outwards or radially outwards.

The working chamber 2 has a first working sub-chamber 12 and a second working sub-chamber 13, which are formed substantially identically. The working sub-chambers 12, 13 are arranged alongside one another and are in direct fluid communication with one another. They are open in relation to one another in a connection region.

A first rotor 14 of the rotor assembly 3 is arranged in the first working sub-chamber 12. The first rotor 14 is arranged non-rotatably on a first rotor shaft 15, which is mounted in the housing 1 in a manner in which it is rotatable or rotationally drivable about its first longitudinal center axis 16.

Figure 1:
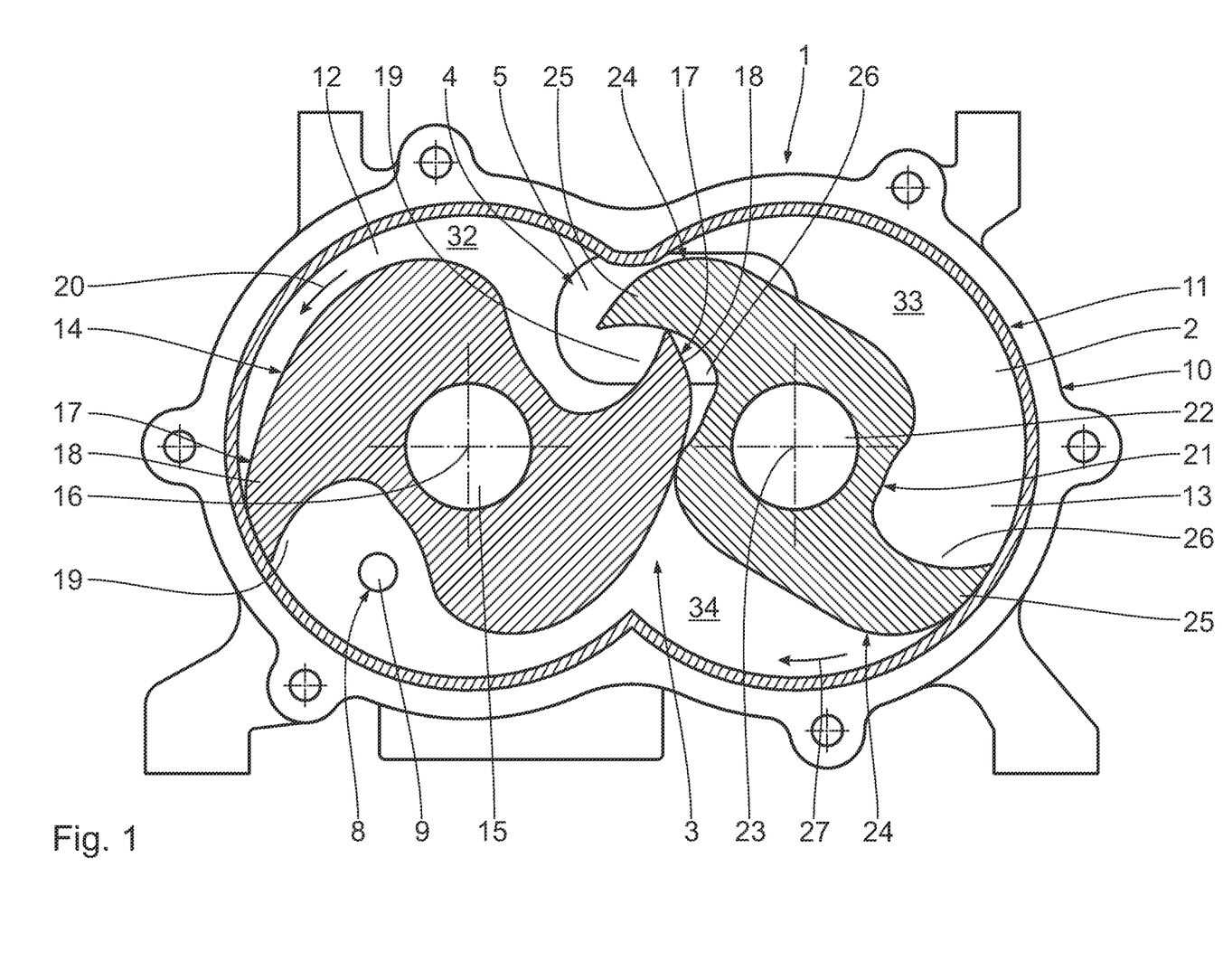
FIG. 1 is a cross-sectional plan view illustrating a rotary piston compressor/pump/blower, where a rotor assembly is shown in a sequential position, and the rotor assembly is shown interacting with an intake connection, a pressure connection, and a ventilation channel in accordance with example embodiments of the present disclosure.

The contour of the first rotor 14, e.g., as shown in FIG. 1, is point-symmetrical in relation to the first longitudinal center axis 16. It has two first rotor blades 17 which are opposite one another, and which project from a first rotor base body. Each first rotor blade 17 has a first claw 18 and a first claw recess 19 limited by the first claw 18. The first claw recesses 19 are open radially outwards in relation to the first longitudinal center axis 16. They are spatially limited by the first claws 18 counter to a first rotational direction 20 of the first rotor 14 and also partially radially outwards.

A second rotor 21 of the rotor assembly 3 is arranged in the second working sub-chamber 13. The second rotor 21 is arranged non-rotatably on a second rotor shaft 22, which is arranged in the housing 1 in a manner in which it is rotatable or rotationally drivable about its second longitudinal center axis 23. The rotor shafts 15, 22 run parallel to one another.

The second rotor 21 is point-symmetrical in relation to the second longitudinal center axis 23. It includes two second rotor blades 24 which are opposite one another, and which project from a second rotor base body. Each second rotor blade 24 has a second claw 25 and a second claw recess 26 limited by the second claw 25. The second claw recesses 26 are open radially outwards in relation to the second longitudinal center axis 23. They are spatially limited by the second claws 25 counter to a second rotational direction 27 of the second rotor 21 and also partially radially outwards.

In some embodiments, the first rotor 14 and the first rotor shaft 15 are integrally connected to one another. In some embodiments, they are separate from one another. A similar arrangement can apply to the second rotor 21 and the second rotor shaft 22.

In embodiments, each rotor shaft 15, 22 is mounted on both sides in the housing 1. In embodiments, the first rotor shaft 14 is in drive communication with a drive. The rotor shafts 15, 22 are in drive communication with one another, e.g., via a synchronization mechanism.

The first claws 18 are dimensioned or formed in such a way that they sweep closely along the housing base part 11 on the inside during rotation in the first rotational direction 20. The second claws 25 are dimensioned or formed in such a way that they sweep closely along the housing base part 11 on the inside during rotation in the second rotational direction 27.

The intake connection 4 is arranged in the first bearing plate 10. The intake connection 4 opens out eccentrically into the first working sub-chamber 12 and also into the second working sub-chamber 13 via the intake connection opening 5. The intake connection opening 5 is mainly located in the second working sub-chamber 13.

The pressure connection 6 is arranged in the first bearing plate 10. The pressure connection 6 opens out eccentrically into the first working sub-chamber 12 via the pressure connection opening 7.

The ventilation channel 8 is arranged in the first bearing plate 10. The ventilation channel 8 opens out eccentrically into the first working sub-chamber 12 via the ventilation channel opening 9. The ventilation channel opening 9 is arranged alongside the pressure connection opening 7. It is arranged between the intake connection opening 5 and the pressure connection opening 7 in the first rotational direction 20. With reference to the first rotational direction 20, the ventilation channel opening 9 is arranged upstream of the pressure connection opening 7 and downstream of the intake connection opening 5.

The ventilation channel opening 9 is substantially smaller than the pressure connection opening 7. It is substantially smaller than the intake connection opening 5, which is larger, in particular substantially larger, than the pressure connection opening 7. In embodiments, the surface area of the ventilation channel opening 9 is between 1% and 10%, e.g., between 2% and 5%, of the surface area of the intake connection opening 5. In embodiments, it is between 7% and 20%, e.g., between 10% and 16%, of the surface area of the pressure connection opening 7.

The operation of the rotary piston compressor/pump/blower is described hereinafter. The first rotor shaft 15 is set in rotation about the first longitudinal center axis 16 in the first rotational direction 20 by means of the drive. The second rotor shaft 22 is also set in rotation correspondingly via the synchronization mechanism which is active between the first rotor shaft 15 and the second rotor shaft 22. The rotor shafts 15, 22 and thus also the rotors 14, 21 are driven in rotation in opposite directions. The rotors 14, 21 act together and are temporarily in meshing engagement with one another.

With reference to FIG. 1, a beginning of a suction cycle of the rotary piston compressor/pump/blower is described. The intake connection opening 5 is only partially closed by the first rotor 14 and the second rotor 21. It is also partially open. Gas can therefore flow into the first working sub-chamber 12 and second working sub-chamber 13 via the intake connection 4.

The pressure connection opening 7 is completely closed by the first rotor 14.

The first rotor 14 and the second rotor 21 block fluid communication between the intake connection opening 5 and the ventilation channel opening 9. A first claw 18 of the first rotor 14 engages a second claw recess 26 of the second rotor 21.

The rotors 14, 21, together with the housing 1 in the working chamber 2, limit a suction or inlet space 32, which is connected to the intake connection opening 5 on both sides and extends into the first and second working sub-chambers 12 and 13. The suction or inlet space 32 becomes larger during the suction cycle by rotation of the rotors 14, 21. It is closed.

The ventilation channel opening 9 is completely open. It is uncovered. A working space 33, which is substantially spatially limited by the housing 1 and the second rotor 21 and is located in the second working sub-chamber 13, is about to undergo an isochoric transport, as shown in FIG. 1.

Due to the kinematics of the gas which are brought about by the rotation of the second rotor 21, a static negative pressure prevails in the working space 33 of the rotary piston compressor/pump/blower in relation to atmospheric pressure.

With reference to FIG. 1, an expansion/ventilation space 34 of the rotary piston compressor/pump/blower extends in the first working sub-chamber 12 and the second working sub-chamber 13. It is spatially separate from the suction or inlet space 32 and the working space 33. The expansion/ventilation space 34 is spatially limited by the first rotor 14, the second rotor 21 and the housing 1.

Again, with reference to FIG. 1, the ventilation channel opening 9 is in fluid communication with the expansion/ventilation space 34. The expansion/ventilation space 34 is under positive pressure or negative pressure in relation to atmospheric pressure, depending on an operating point reached.

If positive pressure prevails in the expansion/ventilation space 34 in relation to atmospheric pressure, the expansion/ventilation space 34 or the gas enclosed there is expanded into the atmosphere via the ventilation channel opening 9 or the ventilation channel 8.

By contrast, if an operating point is reached at which an inner compression in the expansion/ventilation space 34 is insufficient in order to raise the static pressure to atmospheric pressure, negative pressure prevails in the expansion/ventilation space 34 also shortly prior to opening or reaching the pressure connection opening 7 in relation to atmospheric pressure. In this case, the expansion/ventilation space 34 is then ventilated atmospherically via the ventilation channel opening 9 or the ventilation channel 8. At this operating point, e.g., less than 400 megabars (mbar) negative pressure prevails in the expansion/ventilation space 34 in relation to atmospheric pressure.

Figure 2:
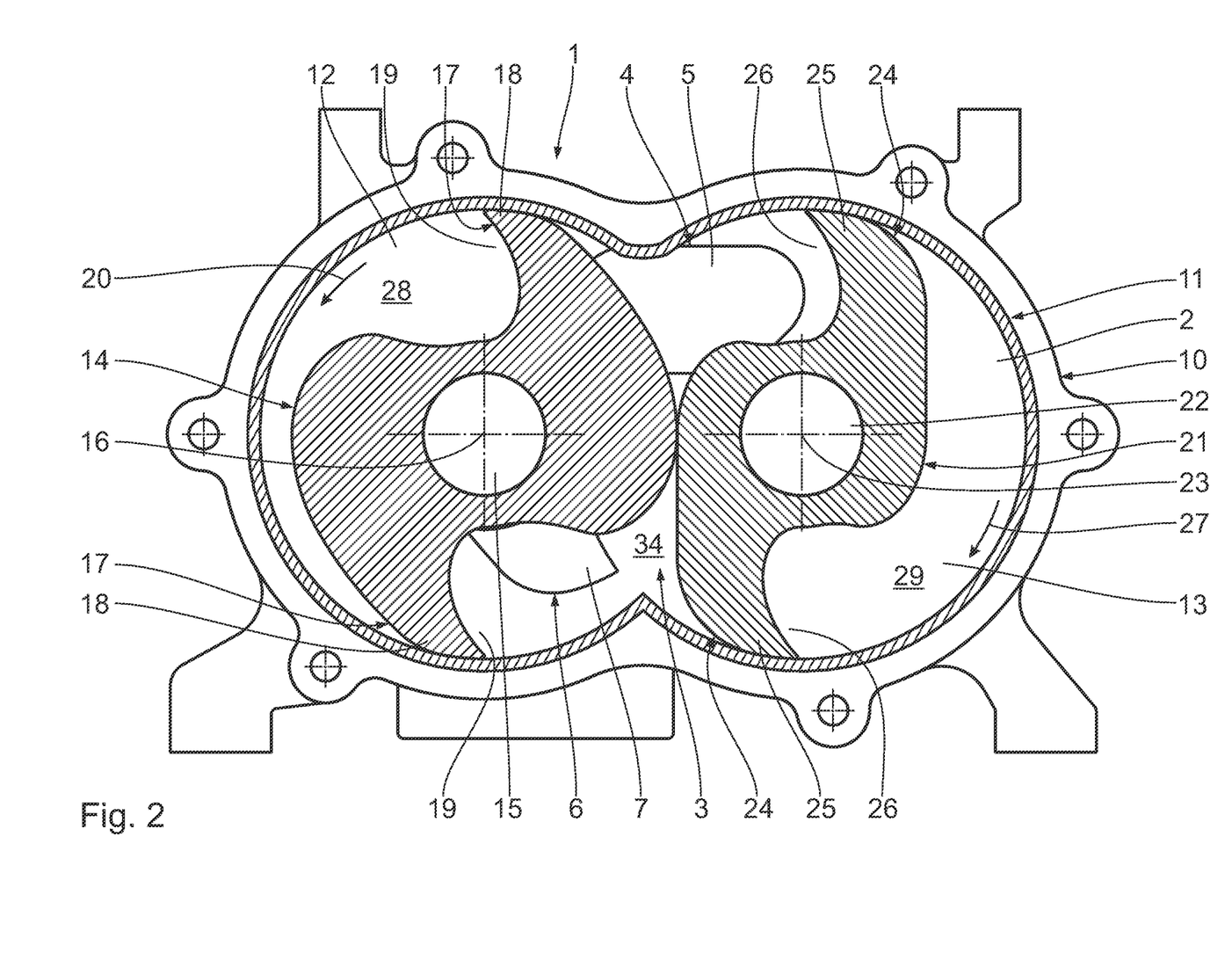
FIG. 2 is another cross-sectional plan view of the rotary piston compressor/pump/blower illustrated in FIG. 1, where the rotor assembly is shown in another sequential position in accordance with example embodiments of the present disclosure.

Referring now to FIG. 2, an isochoric transport cycle, for the isochoric transporting of the sucked-in gas enclosed in the suction space 32, is connected to the suction cycle. The suction space 32 or the gas enclosed therein has been divided into/onto two separate, mutually separated transport spaces 28, 29 by rotation of the rotors 14, 21 in the respective rotational direction 20 or 27 by an angular range of 50° to 75°, which transport spaces face away from one another and are limited by the housing 1 and the respective rotor 14 and 21. Each first and second transport space 28 and 29 is arranged and closed off in the respective working sub-chamber 12, 13. The transport spaces 28, 29 and/or the gas enclosed therein are/is displaced isochorically. The rotors 14, 21 are disengaged. In particular, the claws 18 and 25 and the claw recesses 19, 26 of the rotors 14, 21 are disengaged. The second transport space 29 substantially corresponds to the working space 33.

The pressure connection opening 7 is for the most part open. The first rotor 14 opens the pressure connection opening 7. The expansion/ventilation space 34 has become smaller.

The intake connection opening 5 is still partially open. Gas can therefore enter into the working chamber 2 for a new cycle. The rotary piston compressor/pump/blower with the rotors 14, 21 makes two intake and pressure cycles per rotor revolution possible.

The ventilation channel opening 9 is completely closed by the first rotor 14.

Figure 3:
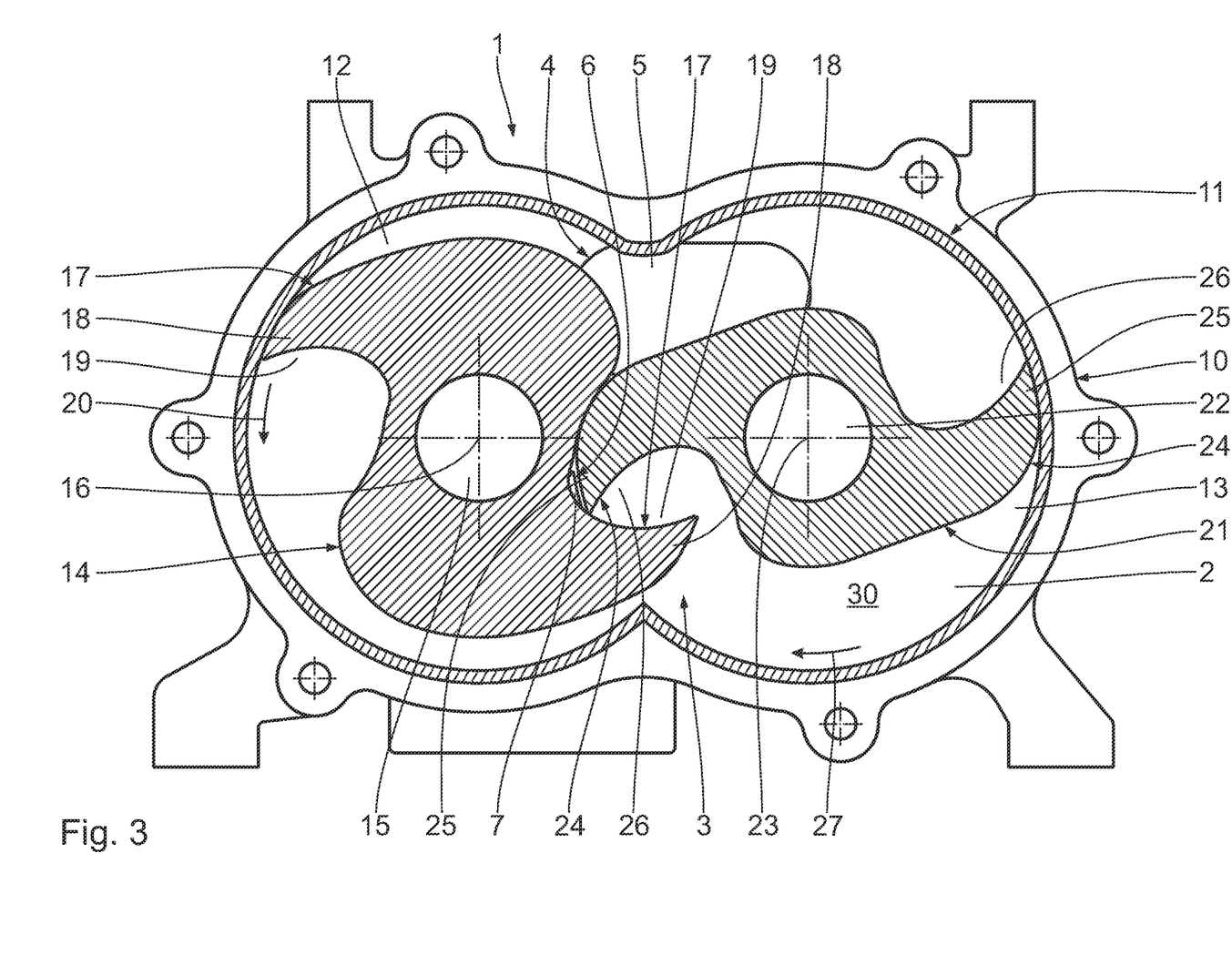
FIG. 3 is a further cross-sectional plan view of the rotary piston compressor/pump/blower illustrated in FIG. 1, where the rotor assembly is shown in a further sequential position in accordance with example embodiments of the present disclosure.

Referring now to FIG. 3, a common working-space phase is connected to the isochoric transport cycle. The two transport spaces 28, 29 are combined to form a common working space 30 by rotation of the rotors 14, 21 in the respective rotational direction 20 or 27 by an angular range of 55° to 85°, which common working space is closed off. The common working space 30 is separated from the intake connection opening 5, which is partially open, via the rotors 14, 21. It is arranged at a distance from the intake connection opening 5. It extends via the first working sub-chamber 12 and the second working sub-chamber 13. A second claw 25 of the second rotor 21 engages a first claw recess 19 of the first rotor 14.

The pressure connection opening 7 is almost completely closed by the first rotor 14. The second rotor 21 blocks fluid communication between the pressure connection opening 7 and the common working space 30.

The ventilation channel opening 9 is completely closed by the first rotor 14.

Figure 4:
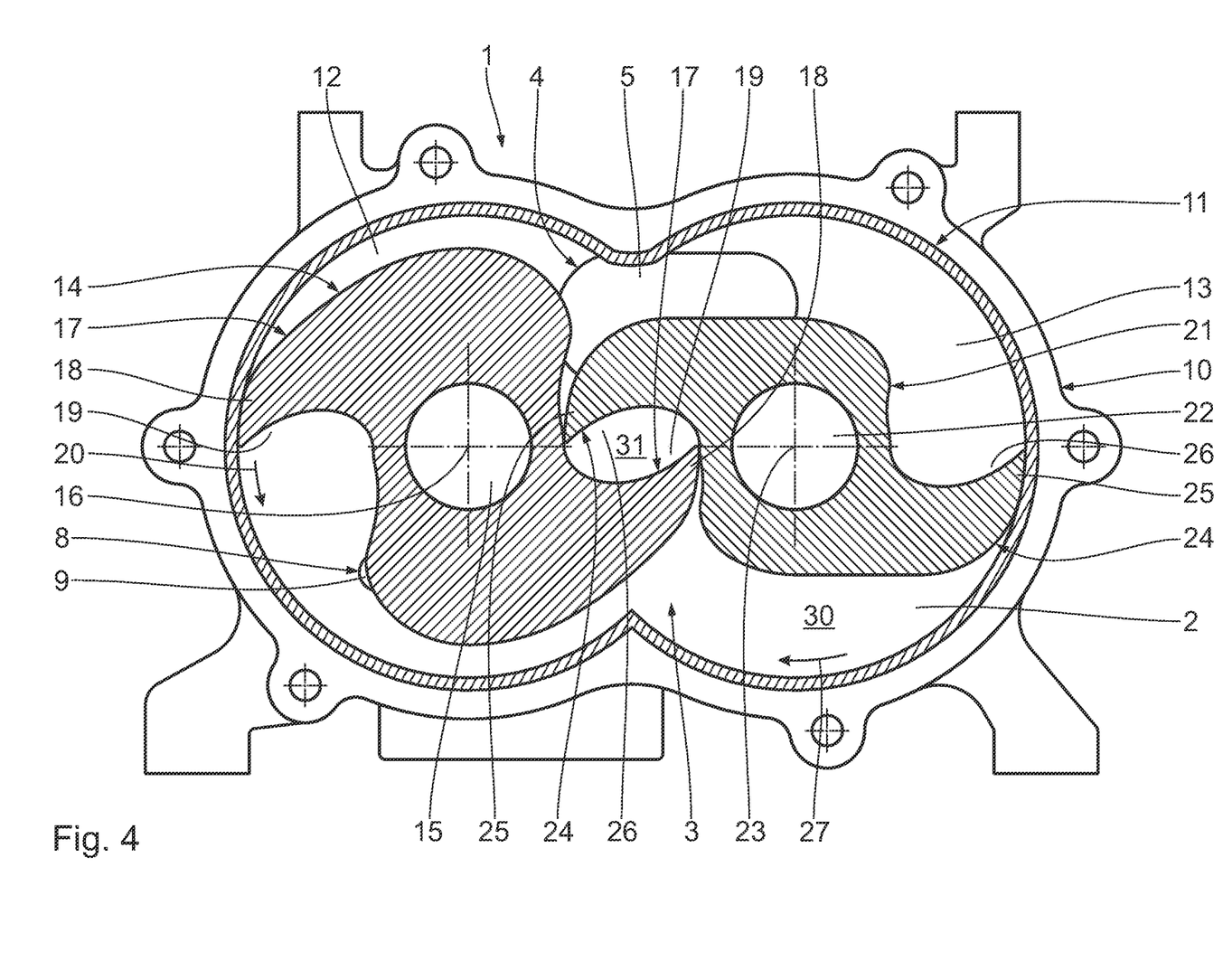
FIG. 4 is another cross-sectional plan view of the rotary piston compressor/pump/blower illustrated in FIG. 1, where the rotor assembly is shown in another sequential position in accordance with example embodiments of the present disclosure.

By rotation of the rotors 14, 21 in the respective rotational direction 20 or 27 by an angular range of 5° to 35°, a dead-space-enclosure and dead-space-feedback phase, which is described with reference to FIG. 4, is connected to the common working-space phase. A dead space 31 is enclosed between the first rotor 14 and the second rotor 21 in a central region of the housing 1 in the working chamber 2 between the neighboring claws 18 and 25, and, respectively, between the neighboring claw recesses 19, 26. The dead space 31 is closed off. It is between the rotor shafts 15, 22. In the dead-space-enclosure and dead-space-feedback phase, the dead space 31 is enclosed and fed back to the intake region.

The ventilation channel opening 9 in this case is gradually released by the first rotor 14. The first rotor 14 opens the ventilation channel opening 9.

The pressure connection opening 7 is completely closed by the first rotor 14.

The intake connection opening 5 is still partially open.

Figure 5:
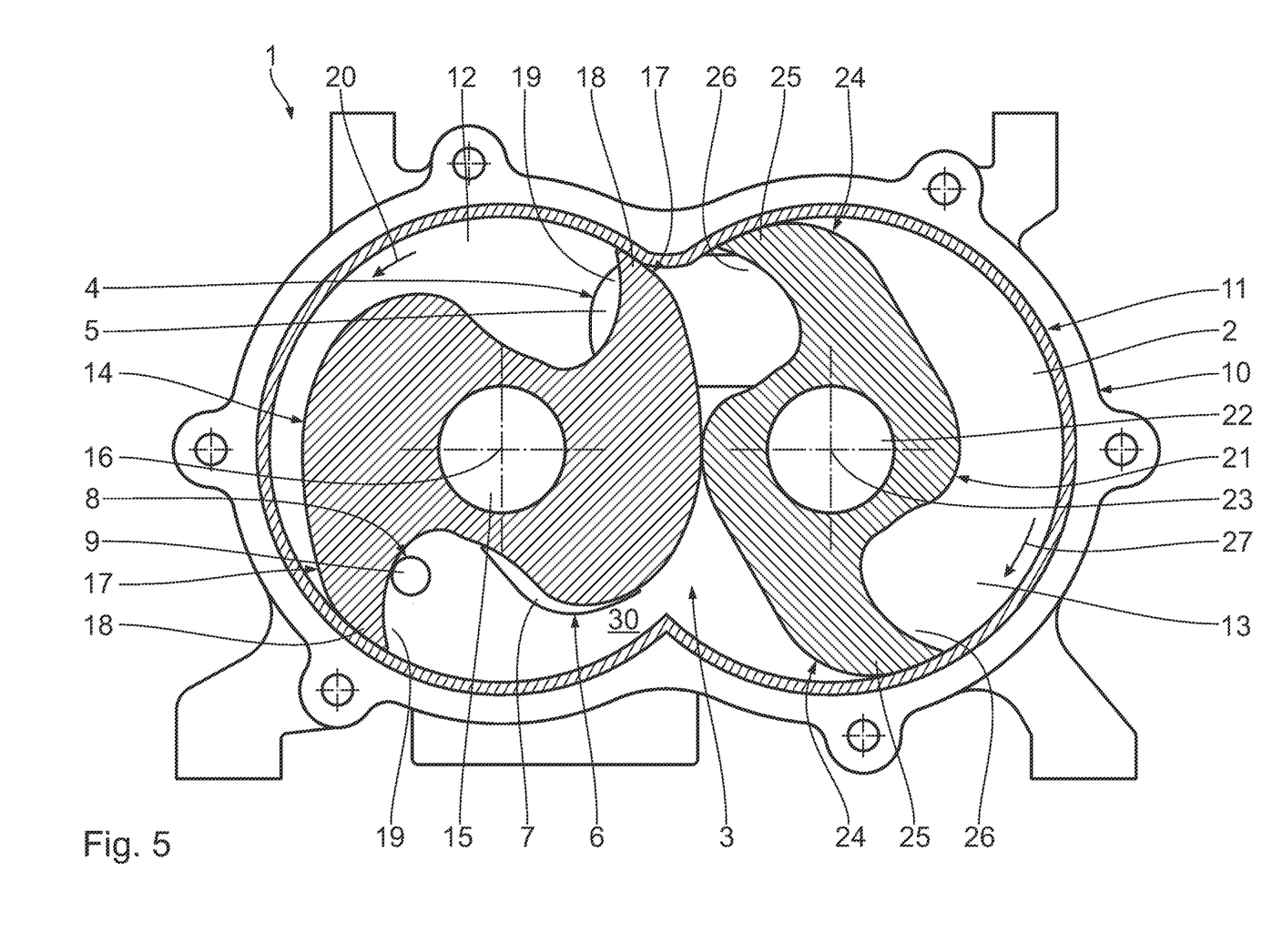
FIG. 5 is a further cross-sectional plan view of the rotary piston compressor/pump/blower illustrated in FIG. 1, where the rotor assembly is shown in a further sequential position in accordance with example embodiments of the present disclosure.

By rotation of the rotors 14, 21 in the respective rotational direction 20 or 27 by an angular range of 45° to 75°, a ventilation-channel opening phase, described with reference to FIG. 5, is connected to the dead-space-enclosure and dead-space-feedback phase, in which ventilation-channel opening phase the ventilation channel opening 9 is completely open and the working space 30 is filled with ambient air and charged to ambient pressure. The working space 30 becomes smaller in its volume. Pressurized air or vacuum can therefore be produced. The first rotor 14 is twisted in comparison with the ventilation channel opening 9.

The first rotor 14 also gradually releases the pressure connection opening 7. It opens it. Gas can therefore leave the working chamber 2 via the pressure channel 6.

The intake connection opening 5 is still partially open.

The rotors 14, 21 are disengaged.

Figure 6:
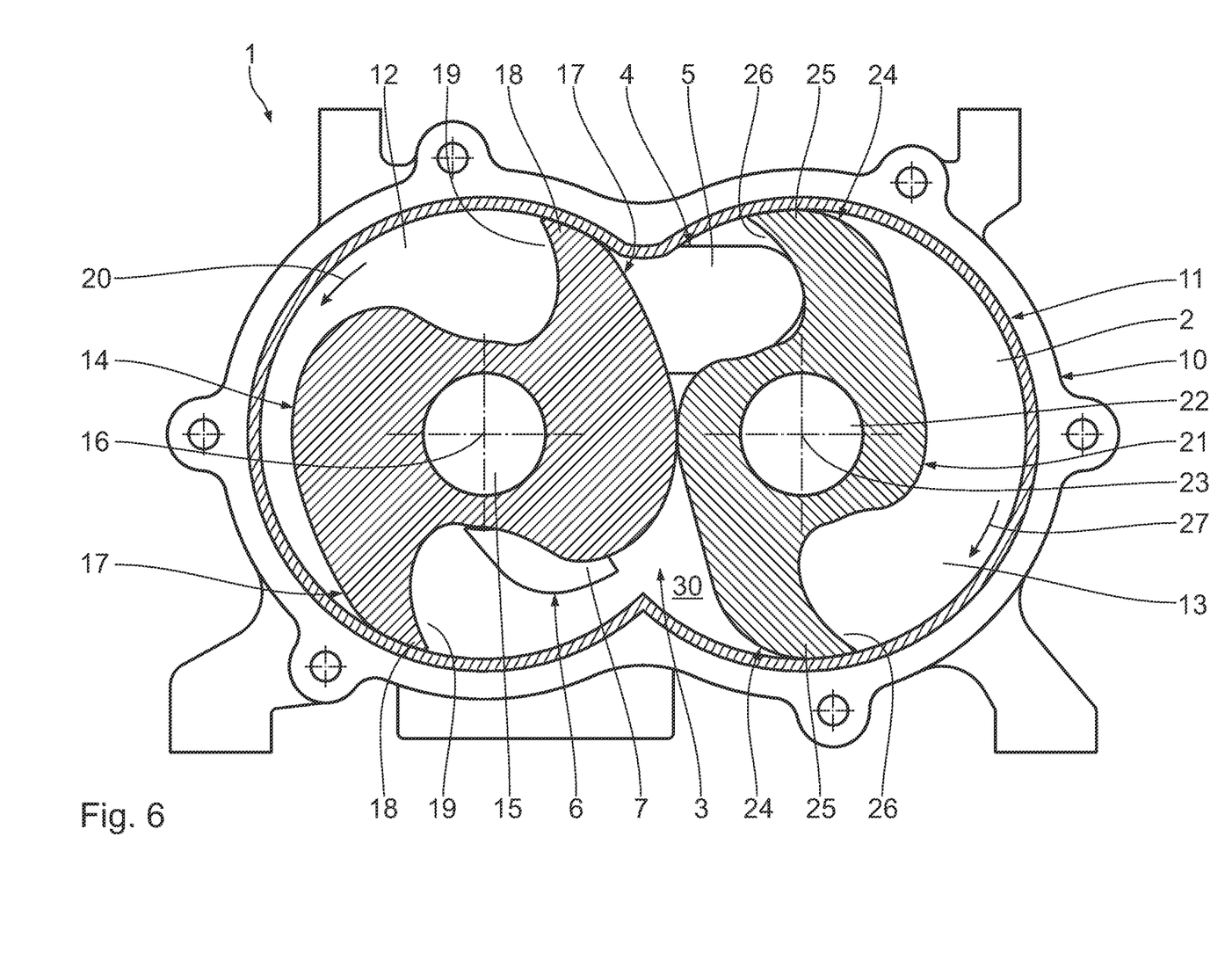
FIG. 6 is another cross-sectional plan view of the rotary piston compressor/pump/blower illustrated in FIG. 1, where the rotor assembly is shown in another sequential position in accordance with example embodiments of the present disclosure.

By rotation of the rotors 14, 21 in the respective rotational direction 20 or 27 by an angular range of 5° to 30°, a further phase, described with reference to FIG. 6, is connected to the ventilation-channel opening phase, in which further phase the ventilation channel opening 9 is completely closed by the first rotor 14. The rotors 14, 21 are disengaged.

The pressure connection opening 7 is at least partially open.

The intake connection opening 5 is still partially open.

There then follows again the suction phase described with reference to FIG. 1. In embodiments, in the case of a rotary piston compressor/pump/blower with double rotor claws, two intake and pressure cycles are performed per rotor revolution.

The first rotor 14 forms a control rotor in relation to the ventilation channel opening 9.

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

The invention claimed is:

1. A rotary piston compressor/pump/blower, comprising:
 a housing defining a working chamber;
 an intake connection in fluid communication with the working chamber for furnishing fluid to the working chamber;
 a pressure connection in fluid communication with the working chamber for guiding the fluid out of the working chamber;
 a rotor assembly including
  a first rotor rotatably arranged in a first working sub-chamber of the working chamber, and
  a second rotor rotatably arranged in a second working sub-chamber of the working chamber and cooperating with the first rotor; and
 a ventilation channel formed in the housing and in fluid communication with the working chamber via a ventilation channel opening for the introduction of fluid into the working chamber from outside the rotary piston compressor/pump/blower, the ventilation channel opening open at least in sections in a compression phase.

2. The rotary piston compressor/pump/blower as recited in claim 1, wherein the rotary piston compressor/pump/blower comprises a single stage rotary piston compressor/pump/blower.

3. The rotary piston compressor/pump/blower as recited in claim 1, wherein the ventilation channel opening is controllable via the first rotor.

4. The rotary piston compressor/pump/blower as recited in claim 1, wherein the first rotor and the second rotor, prior to the compression phase, are configured to limit a common working space in the working chamber in a common working-space phase, wherein the ventilation channel opening is closable by the first rotor in the common working-space phase.

5. The rotary piston compressor/pump/blower as recited in claim 4, wherein in the common working-space phase, the pressure connection is configured to be separated from the common working space by at least one of the first rotor or the second rotor.

6. The rotary piston compressor/pump/blower as recited in claim 4, wherein in the common working-space phase, a dead space between the first rotor and the second rotor is configured to be spatially separate in relation to the common working space.

7. The rotary piston compressor/pump/blower as recited in claim 1, wherein the pressure connection is configured to be closed in the compression phase.

8. The rotary piston compressor/pump/blower as recited in claim 1, wherein the ventilation channel opening is configured to be closed by the first rotor in a pushing-out phase.

9. The rotary piston compressor/pump/blower as recited in claim 8, wherein the pressure connection is configured to be at least partially open in the pushing-out phase.

10. The rotary piston compressor/pump/blower as recited in claim 1, wherein the ventilation channel opening is configured to be open prior to opening of the pressure connection.

11. The rotary piston compressor/pump/blower as recited in claim 1, wherein the ventilation channel opening is arranged in a pressure region of the rotary piston compressor/pump/blower.

12. The rotary piston compressor/pump/blower as recited in claim 1, wherein the ventilation channel opening is arranged alongside a pressure connection opening, arranged in the working chamber, of the pressure connection.

13. The rotary piston compressor/pump/blower as recited in claim 1, wherein the ventilation channel opening opens out into the working chamber at a distance from a dead space between the first rotor and the second rotor.

14. The rotary piston compressor/pump/blower as recited in claim 1, wherein the ventilation channel opening is configured to be completely closed by the first rotor during closure of a dead space between the first rotor and the second rotor.

15. The rotary piston compressor/pump/blower as recited in claim 1, wherein the ventilation channel is arranged in a first end part of the housing, and wherein the housing comprises a bearing plate.

16. A rotary piston compressor/pump/blower, comprising:
a housing defining a working chamber;
an intake connection in fluid communication with the working chamber for furnishing fluid to the working chamber;
a pressure connection in fluid communication with the working chamber for guiding the fluid out of the working chamber;
a rotor assembly including
a first rotor rotatably arranged in a first working sub-chamber of the working chamber, and
a second rotor rotatably arranged in a second working sub-chamber of the working chamber and cooperating with the first rotor; and
a ventilation channel formed in the housing and in fluid communication with the working chamber via a ventilation channel opening for the introduction of fluid into the working chamber from outside the rotary piston compressor/pump/blower, the ventilation channel opening open at least in sections in a compression phase, and the ventilation channel opening closed by the first rotor in a pushing-out phase.

17. A rotary piston compressor/pump/blower, comprising:
a housing defining a working chamber;
an intake connection in fluid communication with the working chamber for furnishing fluid to the working chamber;
a pressure connection in fluid communication with the working chamber for guiding the fluid out of the working chamber;
a rotor assembly including
a first rotor rotatably arranged in a first working sub-chamber of the working chamber, and
a second rotor rotatably arranged in a second working sub-chamber of the working chamber and cooperating with the first rotor; and
a ventilation channel formed in the housing and in fluid communication with the working chamber via a ventilation channel opening for the introduction of fluid into the working chamber from outside the rotary piston compressor/pump/blower, the ventilation channel opening open at least in sections in a compression phase, and the ventilation channel opening closed by the first rotor in a pushing-out phase,
wherein the first rotor and the second rotor, prior to the compression phase, are configured to limit a common working space in the working chamber in a common working-space phase, wherein the ventilation channel opening is closable by the first rotor and dead space between the first rotor and the second rotor is spatially separate in relation to the common working space in the common working-space phase.

\* \* \* \* \*